April 20, 1948.     E. F. GREEN     2,440,087
TIRE RECAPPING MACHINE
Filed Nov. 20, 1944     4 Sheets-Sheet 1
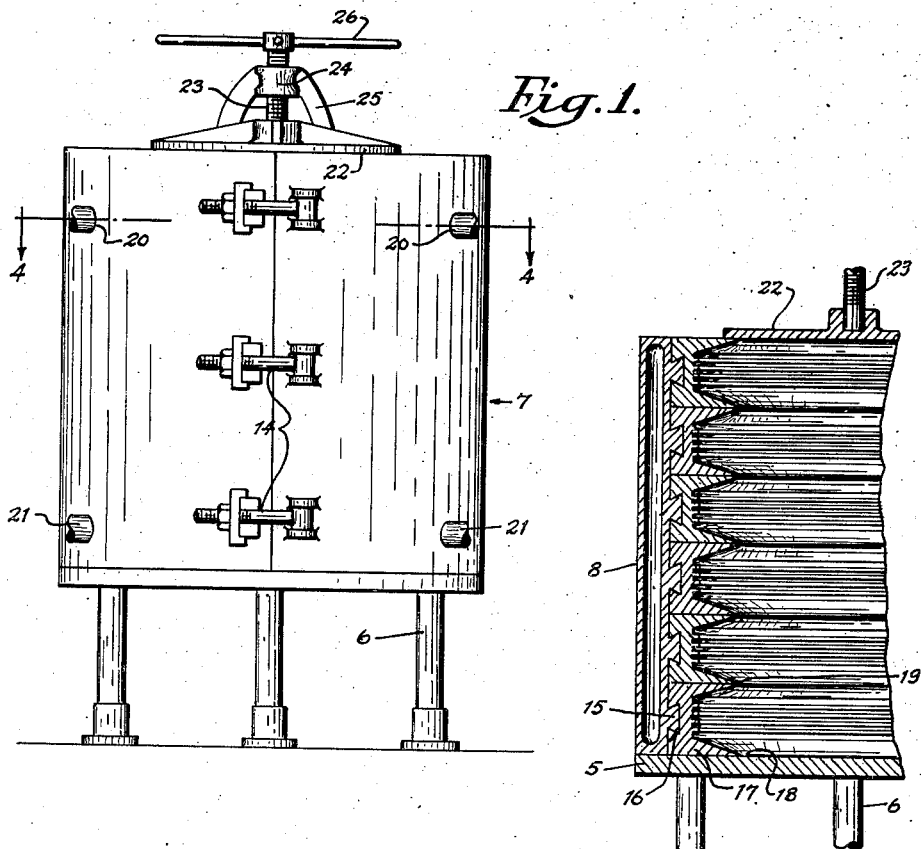
Fig. 1.
Fig. 2.
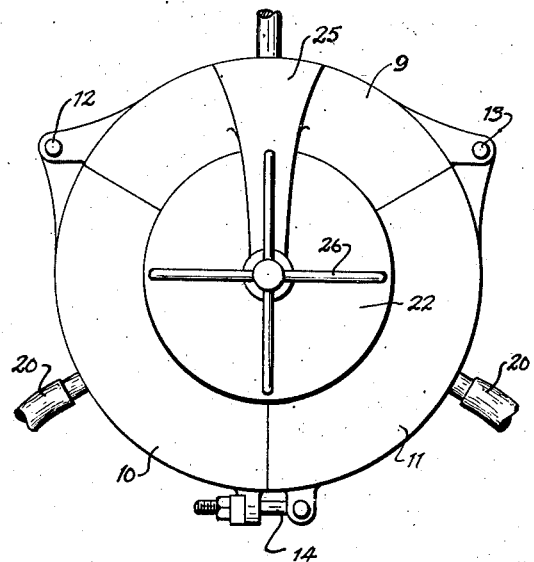
Fig. 3.
Inventor
Edwin F. Green.
By Clarence A. O'Brien
and Harvey B. Jacobson
Attorneys April 20, 1948. E. F. GREEN 2,440,087
TIRE RECAPPING MACHINE
Filed Nov. 20, 1944 4 Sheets-Sheet 2

Inventor
Edwin F. Green.

By Clarence A. O'Brien
and Harvey B. Jacobson
Attorneys

April 20, 1948.  E. F. GREEN  2,440,087
TIRE RECAPPING MACHINE
Filed Nov. 20, 1944   4 Sheets-Sheet 3

Inventor
Edwin F. Green.

By *Clarence A. O'Brien and Harvey B. Jacobson*
Attorneys

April 20, 1948.    E. F. GREEN    2,440,087
TIRE RECAPPING MACHINE
Filed Nov. 20, 1944    4 Sheets-Sheet 4

Inventor
Edwin F. Green.

By Clarence A. O'Brien
and Harvey B. Jacobson
Attorneys

Patented Apr. 20, 1948

2,440,087

UNITED STATES PATENT OFFICE 2,440,087

TIRE RECAPPING MACHINE

Edwin F. Green, Ashland, Ky.

Application November 20, 1944, Serial No. 564,323

1 Claim. (Cl. 18—18)

The present invention relates to machines for re-capping pneumatic tires and has for its primary object to provide a mold adapted for simultaneously receiving a plurality of tires or securing the same within a re-capping matrix and simultaneously subjecting the tires to a heating agent for securing a re-cap in position thereon.

More specifically, the invention embodies the provision of a cylindrical mold or drum formed of a plurality of longitudinally split hollow sections pivotally connected to each other in order that the sections may be moved into an open position and adapted to receive a plurality of the tire re-capping matrices in which the tires may be placed and secured in a position within the mold one against the other while the individual sections of the mold are subjected to a heating agent to accomplish the re-capping action.

An important object of the present invention is to provide a tire re-capping mold of this character in which the matrices for re-capping the tire may be interchangeably mounted in the mold and various sizes of matrices used for re-capping tires of different sizes and which at the same time is simple and practical in construction, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a fragmentary vertical sectional view.

Figure 3 is a top plan view.

Figure 4:
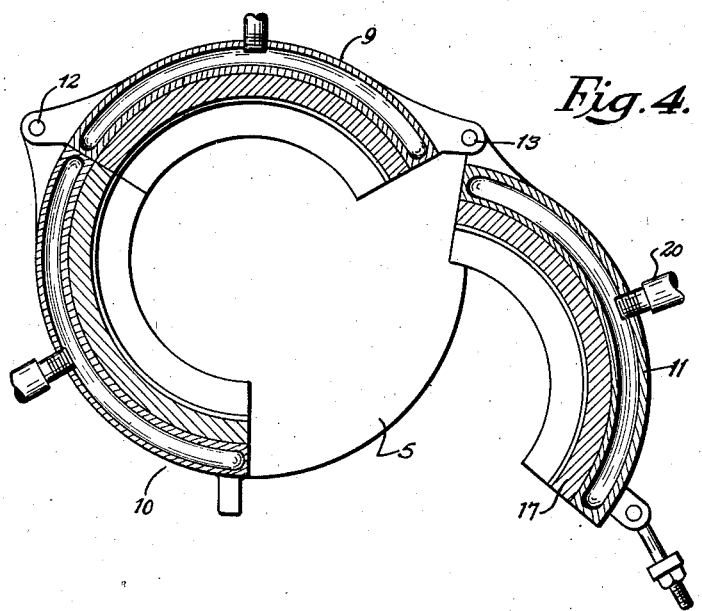
Figure 4 is a transverse sectional view taken substantially on a line 4—4 of Figure 1.

Referring now to the drawings in detail wherein for the purpose of illustration I have disclosed a preferred embodiment of the invention, the numeral 5 designates a lower pressure plate supported on legs 6 and the numeral 7 designates the cylindrical mold generally which is composed of a plurality of longitudinally split hollow sections 8 and including a section 9 which is fixed to the base 5 and a pair of sections 10 and 11 pivotally connected to the opposite ends of the section 9 by means of the end members 12 and 13, respectively. The free ends of the sections 10 and 11 are secured together in a closed position by means of conventional form of clamping bolts 14, the sections 10 and 11 thus being adapted for swinging horizontally toward and away from each other to open and close the mold.

Figure 5:
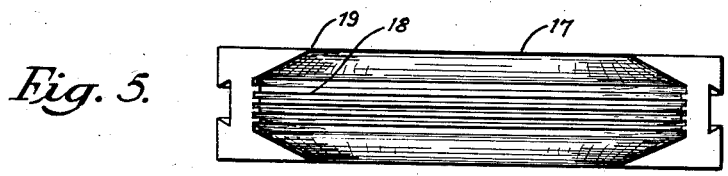
Figure 5 is a side elevational view of one of the sectional tire re-capping matrices.
Figure 6:
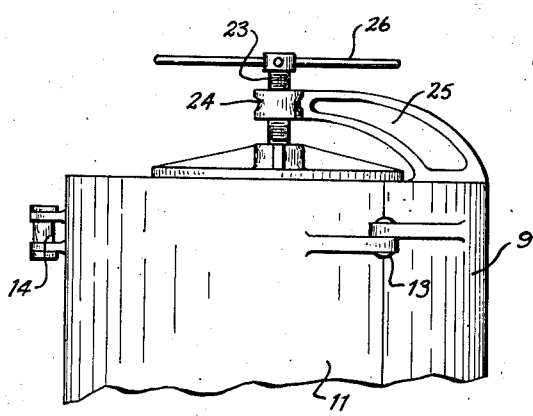
Figure 6 is a fragmentary side elevational view showing the clamping head for securing the tires in assembled position in the mold.
Figure 7:
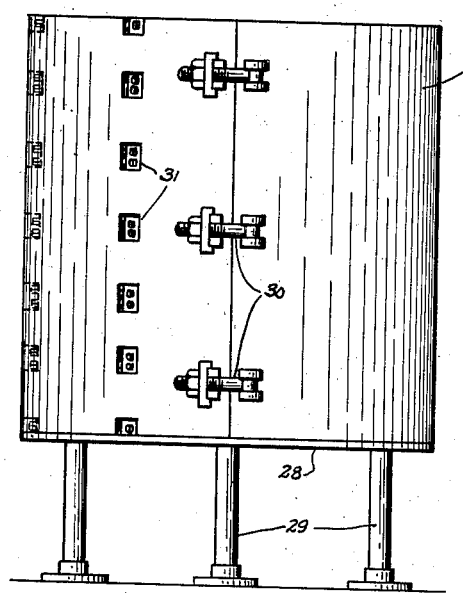
Figure 7 is a side elevational view of a modified form of the invention.
Figure 8:
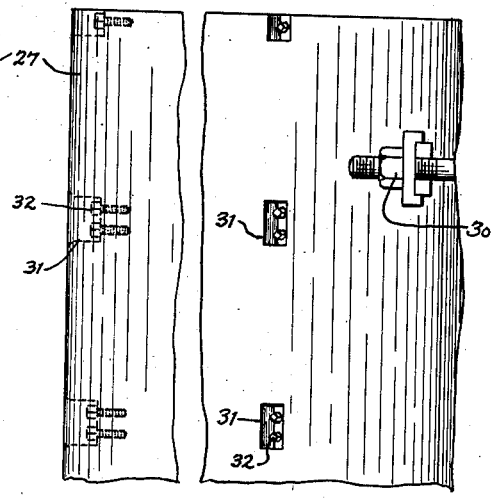
Figure 8 is an enlarged fragmentary side elevational view thereof.
Figure 9:
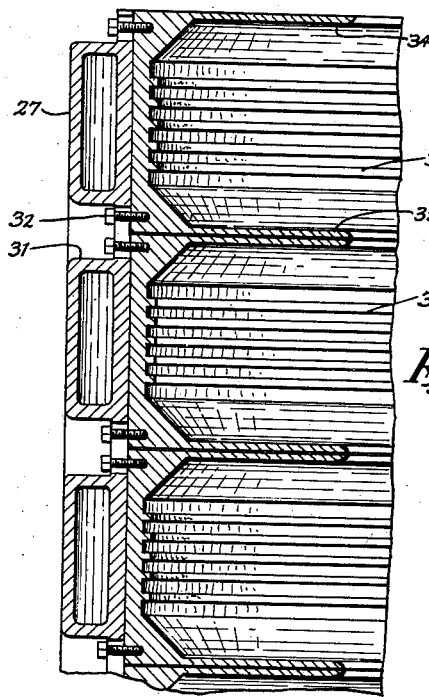
Figure 9 is an enlarged fragmentary sectional view showing the matrices in the casing.
Figure 10:
Figure 10 is a transverse sectional view of one of the matrices.

The inner walls of the sections of the mold are formed with a plurality of vertically spaced circumferentially extending tongues 15, preferably of dove-tail formation in cross-section as shown in Figure 2 of the drawings and adapted for conformably fitting in grooves 16 formed in the peripheral edges of sectional tire re-capping matrices 17, one of which is shown in detail in Figure 5 of the drawings, the sections of the matrices being of a length corresponding to the length of the sections of the mold.

The inner edge of the matrices are circumferentially grooved as shown at 18 to receive the tread of the re-cap (not shown) and the side edges of the matrices tapered to a point as shown at 19 so that when the sections of the matrices carried by the sections 10 and 11 of the mold are closed against the periphery of a tire the pointed edges 19 will form wedges adapted to enter between the tires to properly guide the tires into position in the matrices during the closing of the sections 10 and 11 of the mold.

To the upper portion of each of the sections of the mold is attached a steam inlet pipe 20 and a return pipe 21 by means of which steam may be entered into the several sections of the mold for heating the tires in the usual manner to perform the vulcanizing action of the re-cap on the tire casing.

The uppermost matrix is provided with a pressure plate 22 which closes the top of the mold, the pressure plate being moved vertically by means of a screw 23 rising therefrom and threaded through a guide 24 on an arm 25 secured to the stationary mold section 9. The screw 23 is manipulated by means of a handle 26.

In the operation of the device the sections 10 and 11 of the mold are moved into open position, the sectional matrices 17 placed in position therein and retained in place by the tongues and grooves 15 and 16, after which the tires are placed in position on the sections of the matrices carried by the stationary section 9 and the sections 10 and 11 moved into closed position. The top pressure plate is then moved downwardly on top of the mold and the tire is then heated to accomplish the re-capping thereon.

In Figures 7 to 10, inclusive, I have illustrated a modified form of the invention and in which the sectional cylindrical mold or drum is indicated at 27 supported on the lower plate 28 and legs 29, the sections of the mold being secured in closed position by the clamp 30.

Recesses 31 are formed in the sides of the mold to the inner wall of the mold and through which bolts 32 are threaded into the peripheral edges of sectional matrices 33. The matrices are formed with upper and lower flanges 34 and 35 extending radially inwardly and between which the side walls of the tire casing is held during the re-capping of the tire, the flanges thus serving as pressure plates.

Figure 12:
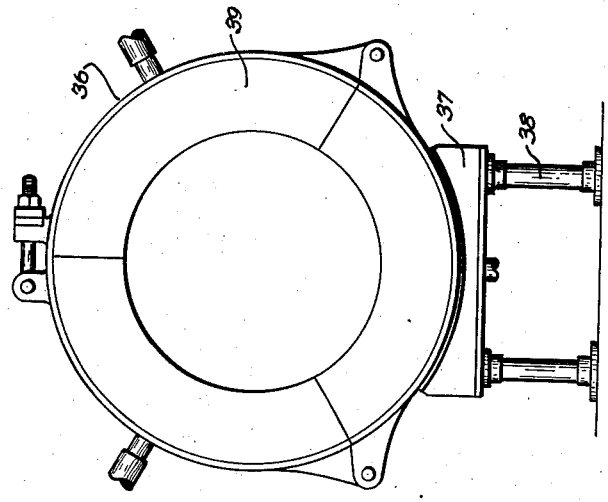
Figure 12 is an end elevational view thereof.
Figure 11:
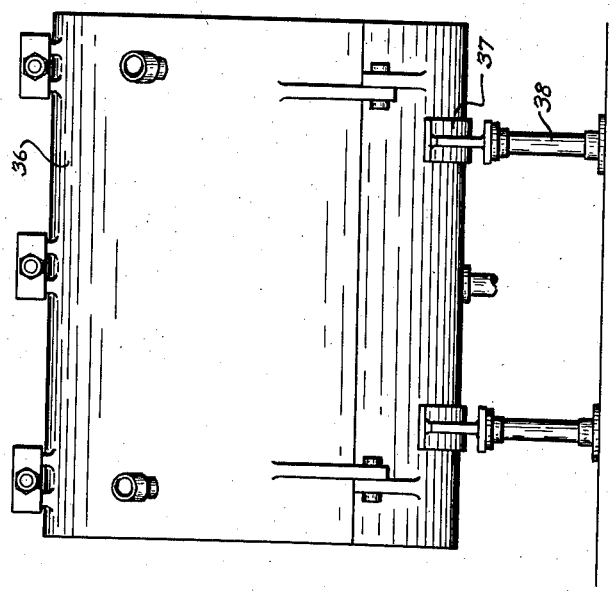
Figure 11 is a side elevational view of a further modification.

Figures 11 and 12 illustrate a further modified construction and shows the sectional mold 36 supported in a horizontal position on saddles 37 mounted on legs 38. The flanges 39 of the sectional matrices hold the tires in position in the mold.

It is believed that the details of construction and manner of use of the device will be readily understood from the foregoing without further detailed explanation.

Having thus described the invention, what I claim is:

A tire capping mold comprising a cylindrical casing split longitudinally into casing sections of arcuate form transversely, said sections being hollow to contain a heating medium, one of the sections being rigidly mounted, and the other sections being hinged to side edges of the rigidly mounted section for swinging thereon into and from cylinder forming relation to said rigidly mounted section, and a plurality of arcuate matrix sections for molding tire treads mounted on each of said casing sections in side by side relation for assembling end to end into annular form when said hinged sections are swung into cylinder forming relation to said rigidly mounted section, means to detachably mount said matrix sections on said casing sections, a pressure plate coacting with matrix sections at one end of the casing to form a closure for said end, and a plate for closing the other end of the casing and supporting said sections in the cylinder forming relation of said sections.

EDWIN F. GREEN.

REFERENCES CITED

The following references are of record in the file of this patent:

UNITED STATES PATENTS

| Number | Name | Date |
|---|---|---|
| 758,863 | Shaw | May 3, 1904 |
| 1,996,971 | Murphy | Apr. 9, 1935 |
| 2,174,188 | Heintz | Sept. 26, 1939 |
| 2,345,172 | Bacon | Mar. 28, 1944 |
| 2,347,600 | Goode | Apr. 25, 1944 |